UNITED STATES PATENT OFFICE.

BRUCE E. CLARKE, OF KANSAS CITY, MISSOURI.

FOOD COMPOUND.

1,397,723.     Specification of Letters Patent.     Patented Nov. 22, 1921.

No Drawing.     Application filed January 15, 1921. Serial No. 437,586.

*To all whom it may concern:*

Be it known that I, BRUCE E. CLARKE, a citizen of the United States, residing at Kansas City, in the county of Jackson and State of Missouri, have invented certain new and useful Improvements in a Food Compound; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a beverage base of which chocolate, malt and milk are the essential ingredients.

The cacao used in the fabrication of this chocolate-malt-milk beverage base carries only the normal alkali content found in the natural bean and is free from any added alkali. This is essential because the diastase and maltin act only in a slightly acid medium.

The object of the invention is to provide a commercial chocolate-malt-milk beverage base in a liquid or semi-liquid consistency, which may be placed upon the market in containers, ready for use by the addition of a liquid, such as water or milk.

The combination of malt and milk has long been recognized as a valuable food but the best results prior to my invention have not been easily obtainable on account of the difficulty in properly preparing the commercial compound now procurable.

Furthermore, the present mode of preparing and dispensing the popular soda fountain beverage known as "chocolate malted milk" is attended by considerable loss of the malted milk powder, loss of time and, as a result, a less concentrated finished product. This is occasioned in part at least by the peculiar physical properties of the commercial malted milk and to the fact that sufficient time is not taken to insure thorough emulsification and dissemination of the minute particles of the malted milk during the mixing process.

With the ordinary commercial malted milk furnished by the manufacturer, it is practically essential in order to obtain the best results to preliminarily prepare a thin paste consisting of the powdered malted milk and a small quantity of hot water by prolonged stirring in order to preliminarily emulsify the powder to render it easily soluble in the added liquid. After the paste has been stirred to uniformity, it can be rendered available as a food by diluting it with a liquid such as a syrup and water or milk. The resultant beverage will then contain the malted milk in very fine suspension, free from lumps or crusts and present a smooth, velvety appearance.

This, however, is an impractical method for soda fountains on account of the time and care necessary in order to obtain the desired product.

In view of the above, it is generally the practice at soda fountains to measure the malted milk powder in a more or less haphazard manner, the result being that no two glasses contain the same proportions of malted milk powder.

The drink is usually prepared by a mechanical mixer which, in itself, is unsanitary because, in actual practice, the stirring rod of the mechanical mixer is not cleaned after each operation and as a result, the sweetened chocolate and milk solution remain on the stirring rod to attract flies and various other insects, affording a convenient and attractive surface for the propagation of disease germs with the result that the germs are stirred in and become a part of the mixed drink when the machine is again used.

All of these objectionable features will be completely eliminated by practising my invention. I have provided a chocolate-malt-milk beverage base in which the ingredients are exactly proportioned and correctly combined at a temperature which brings about the maximum enzym activity without danger of inhibiting their activity through a slight variance of the heat used. This eliminates any loss of material and time under decidedly more sanitary conditions than those found to exist in the present practice of preparing this product.

The formula may be stated as follows:

| | |
|---|---|
| Chocolate | 4 oz. |
| Sugar | 2 lbs. |
| Salt | 10 grains. |
| Cocoa butter | ¼ oz. |
| Benzaldehyde | 24 drops |
| Cinnamon | 8 drops. |
| Evaporated milk | 20 oz. |
| Tincture vanilla | 1½ oz. |
| Water | 2 qts. |
| Malt extract | 36 oz. |

In carrying out my invention I may reduce raw milk to twice its normal consistency and mix the reduced product with the other ingredients, stirring and heating the combined mass in a steam jacketed vacuum kettle, the degree of vacuum being so adjusted that the boiling point of the contents remains at approximately 69° C., throughout the whole process.

The stirring apparatus may be of such form as to insure a thorough disintegration and intimate mixing of the ingredients, this being an essential step in order to convert the amylaceous bodies therein into substances which emulsify the added cocoa butter and thus render the product homogeneous and more easily miscible with water and milk.

The above process makes the chocolate more soluble and capable of taking up additional cocoa butter.

In order to insure the complete preservation of a very active diastase enzym together with the extremely powerful maltin enzym, the temperature must not be allowed to exceed 71.1° C. (160° F.) at any step in the process of preparing the malt extract, nor must the temperature be exceeded at any time throughout my process, preferably 69° C. Any temperature in excess of 71.1° C., destroys the action of these ferments. According to Dubrunfaut, a nitrogenous ferment, which he terms maltin, exists in barley and in all cereal grains. It is much more active than diastase; and Dubrunfaut suggests that the latter is probably only a product of the decomposition of the former, one part being capable of converting from one to two hundred thousand parts of starch into a soluble condition. It may be present in barley malt to the extent of 1 per cent. *Johnston's Elements of Agricultural Chemistry*, 21st edition, page 249.

This is extremely important because at this temperature, the maltin exhibits its greatest activity when it is capable of converting for each part of maltin present from one hundred thousand to two hundred thousand parts of starch into a soluble condition. The diastase and maltin exhibit their maximum activity in the presence of weak organic acids—the extract of malt used in this preparation is so concentrated that the correct percentage of lactic acid is developed. It is important to note that alkalis, even in very small amounts, stop the action of the ferments, diastase and maltin entirely. It will now be seen that diastatic action cannot progress in mixtures which contain the "prepared" or "treated" cocoas or chocolate because these prepared articles contain as high as three to four per cent. alkali in order to render them more "soluble".

In my process I add a small amount of salt because it has been proven by experiment that many salts, especially the neutral salts, have a decidedly beneficial influence on the rate of diastatic action. The action of the malt diastase and the maltin on the starches contained in the chocolate renders them more soluble.

In actual practice it has been indicated that a typical emulsion results by this treatment so as to make possible a beverage by stirring with a spoon upon the addition of a liquid, such as water or milk, so that there is a practical emulsion formed.

The beverage base, when left standing, will show no indication of separation of the ingredients, there being clearly an admixture of the ingredients according to my process in contradistinction to the simple mechanical mixing following the ordinary methods. The finished product made according to the above description provides a liquid or semiliquid of about 32° Baumé density. The product so prepared may be placed in receptacles, for example, tin cans, to be sealed according to a sterilizing process, preferably at a temperature of 152° F., so that the semi-liquid paste will keep indefinitely while sealed.

The benzaldehyde and cinnamon are added not alone for their flavor and aroma but because of the fact that they oxidize slowly into benzoic acid (after the container is opened). The reaction augments the keeping qualities of the chocolate-malt-milk base because it forms a layer, the exposed portion only which contains the benzoic acid.

The addition of a suitable quantity of a specially prepared extract of malt and the accurate adjustment of temperature throughout the whole treatment are the essential features of this improved process.

When it is desired to prepare the drink, the receptacle is opened and a given quantity is poured into a glass or other container, into which may be added a thinning liquid, such as water or milk. If milk is used, less of the paste will be required than if water is used. The simple stirring of the paste to cause it to dissolve in the liquid will provide a smooth, velvety beverage, rich in food value and very palatable.

It will be seen from the foregoing that I have provided a beverage base whereby a chocolate-malt-milk beverage may be available, ready for use in the best form without an elaborate preparation such as is ordinarily required to provide a beverage of equal perfection.

While the semi-liquid paste is primarily intended for use in connection with instantly prepared beverages or drinks, it is apparent that the paste is also applicable for use in making confections or mixtures with edible substances.

It is to be understood that the chocolate is not essentially a flavor in the food but is included to enhance the food value thereof.

What I claim and desire to secure by Letters-Patent is:

1. A food compound comprising milk, malt and vegetable fat, emulsified within a range of temperature, the minimum being that at which the enzyms become active and the maximum less than that which renders them inert.

2. A food compound comprising milk, malt extract prepared at a temperature not to exceed 71.1° C., so as to insure the preservation of the enzyms diastase and maltin, and a vegetable fat, emulsified at a relatively high temperature but less than that which will destroy the ferments in the malt extract.

3. A food compound comprising milk, malt extract and vegetable fat, emulsified in the presence of chemicals which remain inactive while the food compound is sealed but which readily oxidize upon exposure to the air, thus forming new substances which have a beneficial influence upon the food compound, the temperature of the compound while being emulsified being above that at which the enzyms become active and below that which renders them inert.

In testimony whereof I affix my signature.

BRUCE E. CLARKE.